United States Patent [19]

Paulson et al.

[11] 4,284,371
[45] Aug. 18, 1981

[54] MATERIAL HANDLING SYSTEM

[75] Inventors: Jerome T. Paulson, Long Lake; Lawrence C. Zylka, Dayton, both of Minn.

[73] Assignee: Veda, Inc., Long Lake, Minn.

[21] Appl. No.: 66,574

[22] Filed: Aug. 15, 1979

[51] Int. Cl.³ .............................................. B65G 53/42
[52] U.S. Cl. ..................................... 406/99; 406/107; 406/152; 415/213 A; 417/434; 417/435
[58] Field of Search ...................... 406/41, 42, 96–104, 406/107, 131, 152; 417/201, 231, 234, 434, 435; 415/213 A; 137/570

[56] References Cited

U.S. PATENT DOCUMENTS

| 868,192 | 10/1907 | La Vergne | 417/201 |
| 1,200,844 | 10/1916 | Johnson | 137/570 |
| 1,697,202 | 1/1929 | Nagle | 406/100 X |
| 2,799,229 | 7/1957 | Ogles et al. | 417/231 X |
| 2,970,865 | 2/1961 | Finnegan | 406/152 |
| 3,212,823 | 10/1965 | Raab | 406/152 X |
| 3,370,722 | 2/1968 | Fingerut et al. | 406/101 X |
| 3,905,725 | 9/1975 | Johnson | 417/231 |
| 3,915,594 | 10/1975 | Nesseth | 417/231 |
| 4,114,955 | 9/1978 | Araoka | 406/101 X |

FOREIGN PATENT DOCUMENTS 2409630 10/1974 Fed. Rep. of Germany .......... 406/100

Primary Examiner—Jeffrey V. Nase
Attorney, Agent, or Firm—Burd, Bartz & Gutenkauf

[57] ABSTRACT

A centrifugal pump driven by a tractor draws material, as liquid manure, through a suction hose and discharges the material into one of two discharge hoses. A first discharge hose directs the material back into the source of material to agitate and mix the material. The second discharge hose is used to deliver material from the pump to a transport tank spreader. The pump has a housing rotatably supporting an impeller. A cone-shaped member connects the inlet side of the housing to the suction hose. The inlet end of the suction hose has a one-way door valve which allows the material to move into the suction hose and restricts reverse movement out of the suction hose. The inlet end of the suction hose has an exit opening closed with a movable cover. The cover can be moved to an open position so that material in the suction hose can drain back into the holding area. A primer pump mounted on the housing is operable to prime the pump with fluid.

31 Claims, 9 Drawing Figures

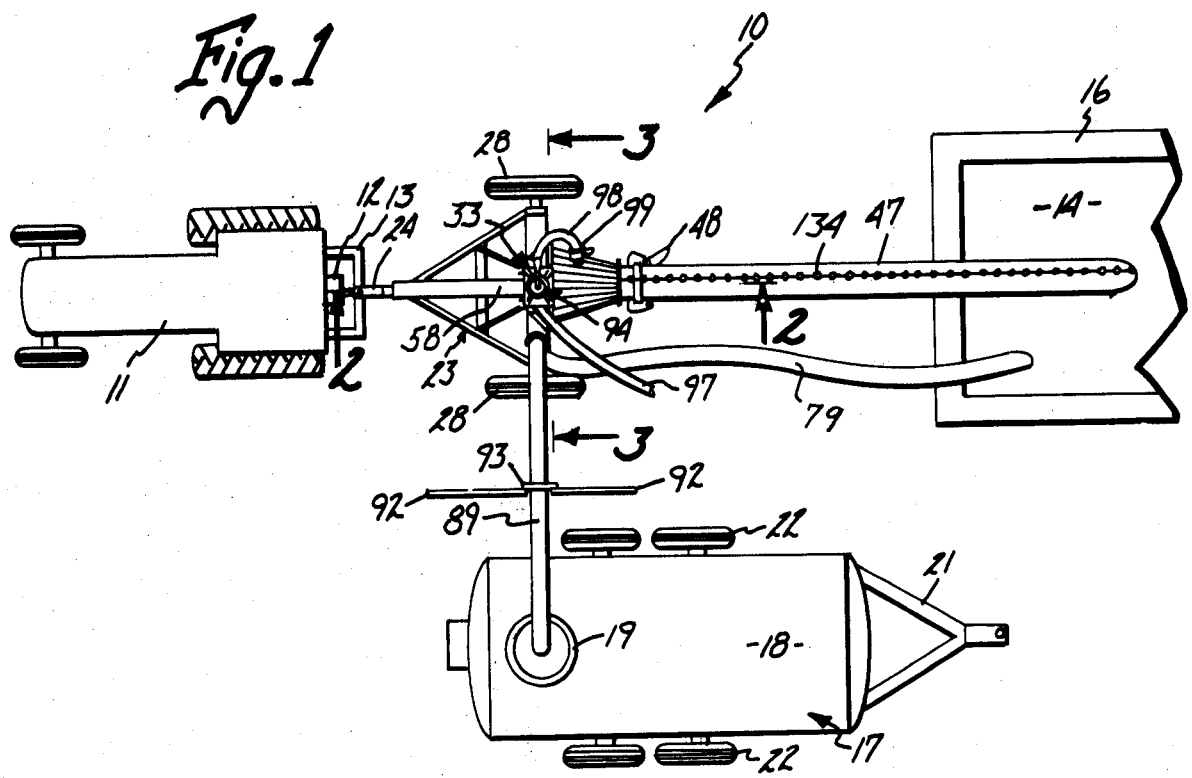
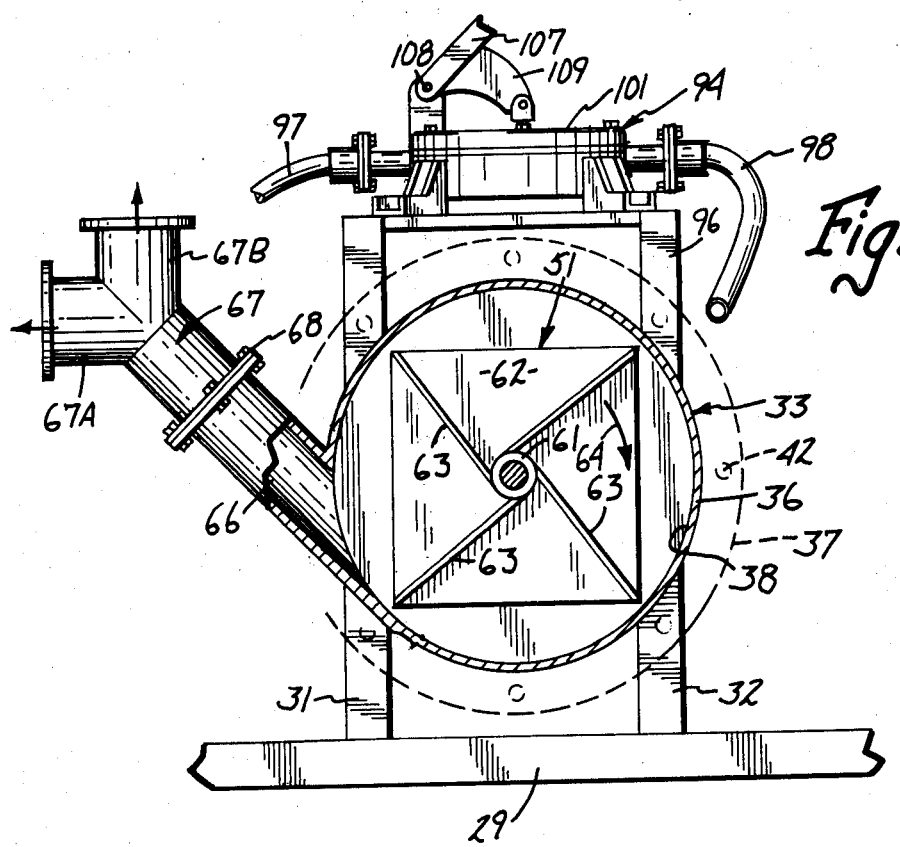

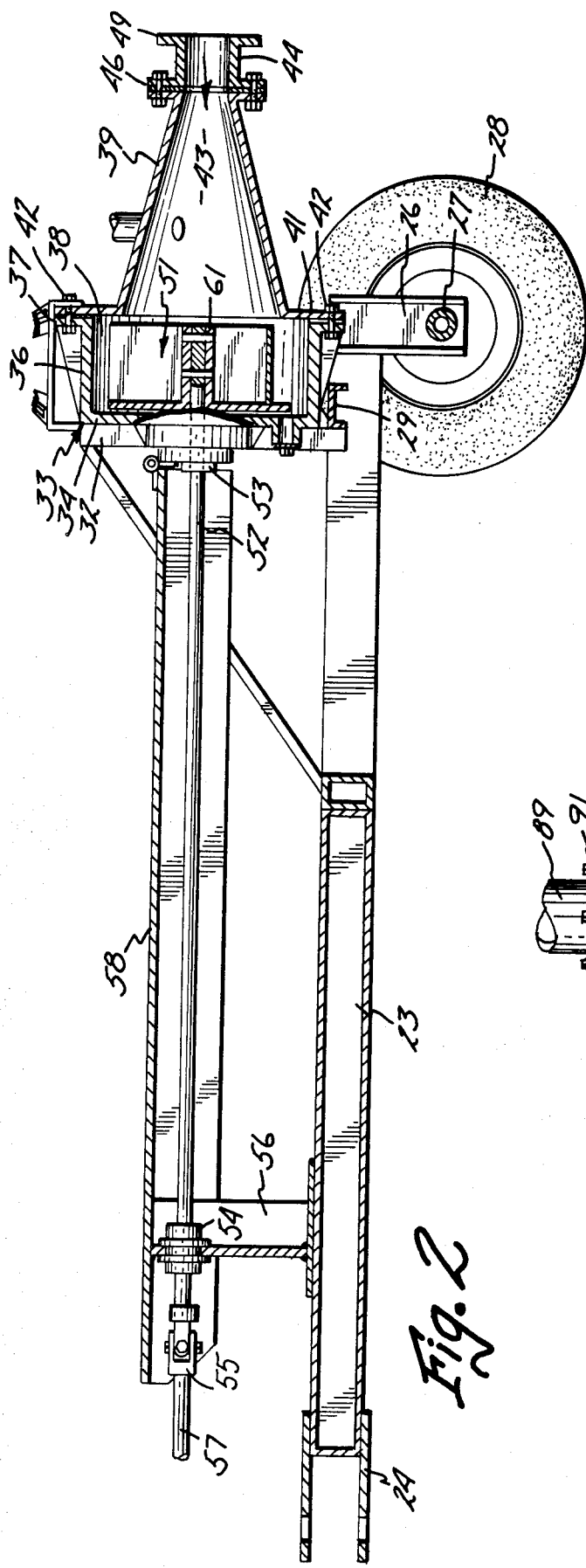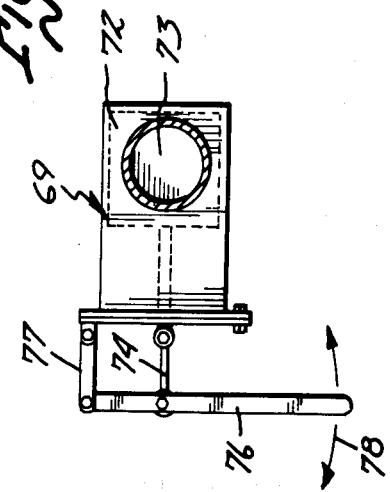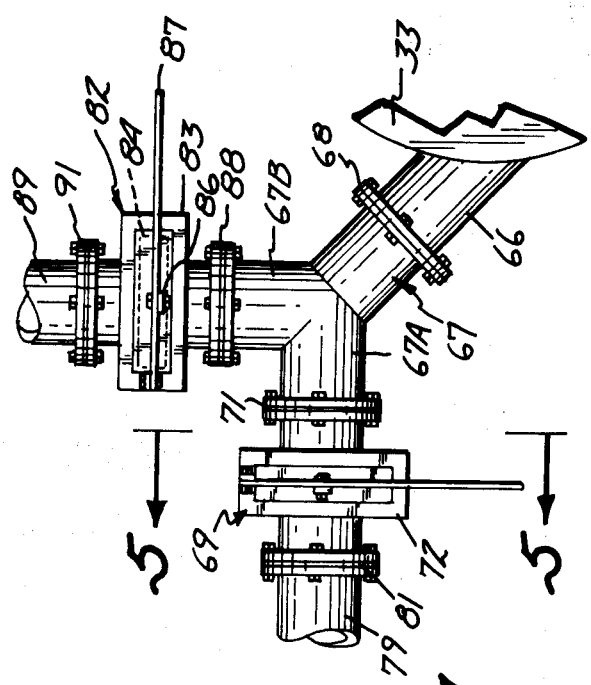

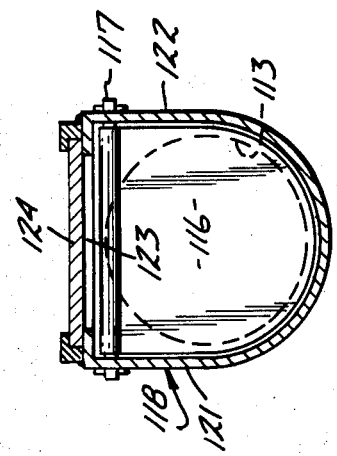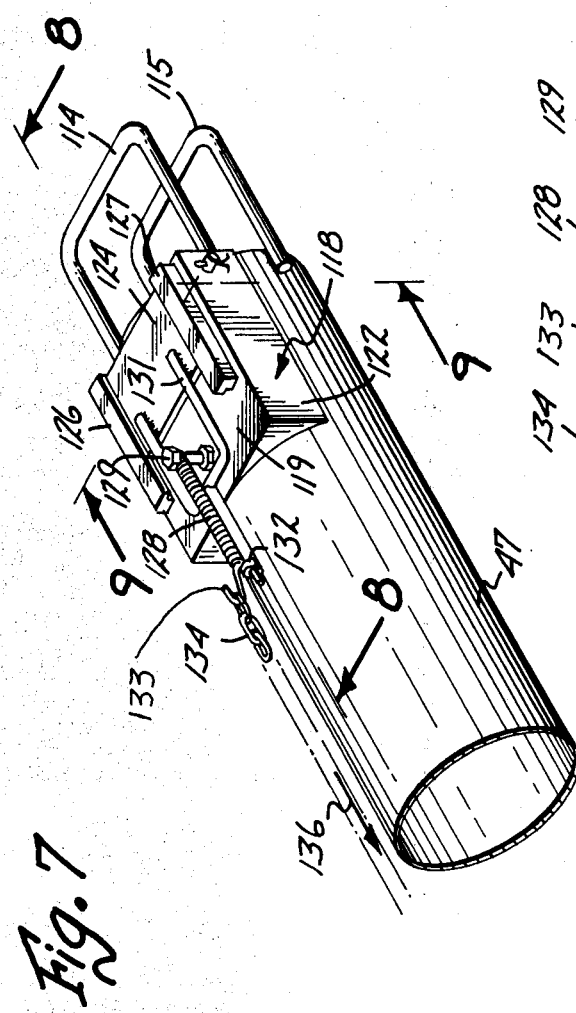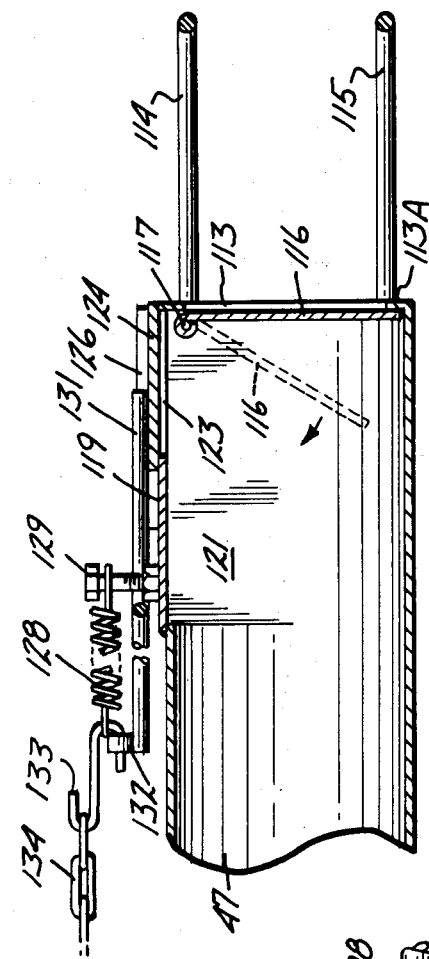

MATERIAL HANDLING SYSTEM

SUMMARY OF INVENTION

Animal wastes, known as liquid manures, are materials that are stored in design structures, as reservoirs, tanks, pits, and like holding areas until they can be distributed into the soil. Manure pits 8 to 10 feet deep are used to store manure until the manure can be spread. A pump apparatus, as disclosed in U.S. Pat. No. 3,905,725, has been developed to effectively pump manure from the pits into manure spreading vehicles, such as the tank vehicle disclosed in U.S. Pat. No. 3,980,236.

Manure storage structures are located adjacent and under floors and buildings so that there is not ready access with the pump apparatus of Pat. No. 3,905,725. The pump of the invention has an elongated suction hose which can be moved under a structure into the bottom of a manure holding pit. The hose is connected to a pump means operable to draw the manure through the suction hose and discharge the material into a discharge hose. The discharge hose carries the material to a fill opening of a tank spreader or desired location. The pump has a housing having a chamber accommodating a rotatable impeller. The impeller has a plurality of outwardly directed blades that face the inlet opening of the housing. The blades are attached to a plate and extend in an outward direction. The impeller is mounted on a power driven shaft used to transmit rotational force to the impeller derived from a drive vehicle, as a tractor. The pump is connected to a second discharge hose which is adapted to carry material back into the pit. The material discharged from the second hose is used to mix and agitate the material in the pit. A Y-connection is connected to the outlet means of the pump and the first and second discharge hoses. First and second valve assemblies are operable to control the flow of material through the outlet sections of the Y-connection.

The suction hose has an inlet end having an inlet opening allowing the material in the pit to move up into the suction means in response to the suction force created by the rotating impeller. A one-way valve or door is pivotally mounted in the inlet end of the suction hose and is moved to a closed position over the inlet opening to prevent reverse flow of material out of the suction hose. The one-way valve is movable to an open position to allow the material to freely flow into the suction hose. The inlet end has an exit passage that is normally closed with a cover. The cover is slidably mounted on the inlet end and is biased to a closed position. An elongated pull member connected to the cover is used to move the cover against the biasing force to an open position. When the cover is in the open position, the material in the suction tube is free to flow back into the pit. The suction hose can then be moved without moving the suction hose full of material. When the suction hose is full of material, it is heavy and difficult to move the suction hose about the pit and into other material holding means.

IN THE DRAWINGS

FIG. 1 is a plan view of the material handling system having the pump and suction hose of the invention driven with a tractor to move material from a material holding area to a tank spreader;

FIG. 2 is an enlarged sectional view taken along the line 2—2 of FIG. 1;

FIG. 3 is an enlarged sectional view taken along the line 3—3 of FIG. 1;

FIG. 4 is a side elevational view of the material control valve assemblies connected to the outlet of the pump;

FIG. 5 is a sectional view taken along the line 5—5 of FIG. 4;

FIG. 6 is an enlarged sectional view of the primer pump;

FIG. 7 is a perspective view of the inlet end of the material suction hose of the pump;

FIG. 8 is an enlarged sectional view taken along the line 8—8 of FIG. 7; and

FIG. 9 is an enlarged sectional view taken along the line 9—9 of FIG. 7.

DESCRIPTION OF PREFERRED EMBODIMENT

Referring to FIG. 1, there is shown the material handling means or pump of the invention indicated generally at 10 connected to a power unit shown as a tractor 11. Tractor 11 has a conventional power takeoff drive 12 and a draw bar 13. Other types of power units can be used to operate pump 10. For example, an internal combustion engine mounted on the pump frame 23 can drive the pump.

Pump 10 is used to move fluid and fluid-like material 14 from a holding means 16, as a pit tank or the like, to a tank spreader indicated generally at 17. Material 14 can be a liquid or a mixture of solids and liquids, as animal manure. Spreader 17 can be a liquid manure spreading vehicle, as disclosed in U.S. Pat. No. 3,980,236. Spreader 17 has an elongated transport tank 18 provided with a top fill hole 19. Tank 18 is mounted on a frame 21. Wheel assemblies 22 connected to frame 21 support the spreader on the ground. Pump 10 can discharge material into a pipe irrigation or dispensing system or into runways or channels that carry the material to a desired location. Pump 10 is hereinafter described as being used to pump liquid manure into a tank spreader.

Pump 10 has a frame 23 comprising rigid structural members that are connected together and joined to a tongue 24. Tongue 24 is a conventional clevis type structure adapted to receive a hitch pin (not shown) to connect the pump to vehicle draw bar 13. Rear portions of frame 23 have downwardly directed legs 26. As shown in FIG. 2, legs 26 support a transverse axle 27 which rotatably support wheels 28. When tongue 24 is hitched to draw bar 13 and when wheels 28 engage the ground, frame 23 is in a generally horizontal position or generally parallel to the ground. Frame 23 has a rear cross member 29 supporting a pair of upright posts 31 and 32. The posts 31 and 32 are attached to and support a pump housing 33 located above the rear portion of frame 23.

Housing 33 has an upright circular front wall 34 and a circumferential rearwardly extended side wall 36. Side wall 36 has a radial outwardly directed continuous flange 37. Side wall 36 surrounds a pump chamber 38. A cone-shaped member 39 having a radially outwardly directed flange 41 is connected to flange 37 with a plurality of nut and bolt assemblies 42. Cone-shaped member 39 has an inlet passage or vestibule 43 that has a large end open to pump chamber 38. A short coupling tube 44 is connected with connecting structure 46 to the inlet end of cone-shaped member 39. Connecting structure 46 comprises outwardly directed flanges on cone-shaped member 39 and tube 44 that are joined together with nut and bolt assemblies. Other types of connecting structures can be used to join coupling tube 44 to cone-shaped member 39.

An elongated inlet or suction hose 47 is connected to tube 44 with a releasable clamp 48. Clamp 48 extends around and is clamped about an annular bead or rib 49 on the end of tube 44. Hose 47 is an elongated flexible tube. Preferably, the hose is six or more inches in diameter and has a length sufficient to extend to the lower portions or bottom of holding means 16, as shown in FIG. 1.

A rotating pumping member or impeller, indicated generally at 51, is located in chamber 38. Impeller 51 is secured to a horizontal shaft 52. Shaft 52 is mounted on a pair of bearings 53 and 54. Bearing 53 is secured to the front wall of housing 33. Bearing 54 is mounted on an upright support or member 56 attached to frame 23. Shaft 52 is connected with a universal joint 55 to a power takeoff shaft 57 that leads to the power takeoff 12 of tractor 11. An elongated generally inverted U-shaped shield 58 extends over shaft 52.

Impeller 51 has a cylindrical hub 61 secured with pins, keys or the like to the end of shaft 52. A square flat plate 62 is secured to the one end of hub 61. Plate 62 is located in contiguous relationship with the inside surface of front wall 34 of housing 33. Four outwardly directed blades 63 are secured to hub 61 and plate 62. As shown in FIG. 3, blades 63 face the inlet side of housing 33 and are spaced approximately 90 degrees from each other and extend generally tangentially from separate portions of hub 61. The blades 63 extend to the corner of plate 62.

In use, tractor 11 through shaft 52 rotates impeller 51 in the direction of the arrow 64, as shown in FIG. 3. The rotating impeller 51 moves the material in the chamber through discharge tube 66 projected tangentially from housing 38. An outlet means or Y-coupling 67 is secured to the outlet end of tube 68 with a flange and bolt connection 68. Y-coupling 67 has a horizontal first outlet section 67A and a vertical second outlet section 67B. A coupling having a single outlet may be attached to tube 66 in lieu of Y-coupling 67.

As shown in FIG. 4, a first valve assembly indicated generally at 69 is connected to outlet section 67A with a flange and bolt connection 71. As shown in FIG. 5, valve assembly 67 has a housing or body 72 accommodating a movable plate or valving member 73. Member 73 is connected to a control rod 74 which extends through an end of housing 72. The outer end of rod 74 is pivotally connected to a hand-operated lever 76. An end of lever 76 is pivotally connected to a fulcrum link 77 pivotally mounted on a portion of housing 72. Lever 76 is moved in the direction of arrow 78 to open the valve assembly. The plate or valving member 73 moves out of blocking engagement of the passage through housing 72 thereby permitting the material to flow through valve assembly 69 into a discharge hose 79. A flange and bolt connection 81 connects hose 79 to the outlet end of valve assembly 69. As shown in FIG. 1, outlet hose 79 is an elongated hose that extends back into the fluid material 14 stored in holding means 16. The fluid material fed back into the holding means 16 functions to agitate and mix the liquid and solid materials in the holding means 16 to provide a flowable material that can be sucked through suction hose 47 into chamber 38 by the rotating impeller 51.

Returning to FIG. 4, a second valve assembly indicated generally at 82 is connected to the top of the second outlet section 67B with a flange and bolt connection 88. Valve assembly 82 has a housing 83 movably accommodating a plate or valving member 84. A rod 86 connects the valving member 84 to a lever 87. Lever 87 is manually movable to move the valving member between the open and closed positions to control the flow of material through the valve assembly 82.

A fill pipe or discharge tube assembly 89 is secured to the outer end of valve assembly 82 with a flange and bolt connection 91. Connection 91 can be a releasable connection which allows the fill pipe to be removed from valve assembly 82. Fill pipe 89 is extended upwardly and has a discharge end extended over the fill hole of tank 18 to direct material into the tank. A pair of support legs 92 attached to a connecting bar 93 hold fill pipe 89 in a selected elevated position. Connecting bar 93 is secured to fill pipe 89.

As shown in FIGS. 1 and 3, a primer pump indicated generally at 94 is mounted on support 96 above housing 33. A suction or inlet hose 97 is connected to the inlet side of pump 94. Hose 97 has an inlet end that is placed in a supply of liquid or material 14. A discharge hose 98 is connected to the outlet end of pump 94 and to an on-off valve 99 connected to the cone-shaped member 39 so that the liquid can be pumped into vestibule 43.

Referring to FIG. 6, primer pump 94 has a body 101 having a pumping chamber 102. A flexible diaphragm 103 extends over the top of chamber 102 and is adapted to be moved into and out of the chamber to effect a pumping action. A piston can be used in lieu of diaphragm 103. A one-way inlet valve assembly 104 is attached to the inlet side of body 101 to control the flow of fluid from hose 97 into chamber 102. Valve assembly 104 prevents the reverse flow of fluid from chamber 102 back into hose 97. A second one-way outlet valve assembly 106 is connected to an outlet or second portion of housing 101. Valve assembly 106 has a one-way valve which allows the fluid to flow from chamber 102 into hose 98.

In use, as diaphragm 103 is moved into and out of chamber 102 the liquid is pumped through the pump from the inlet hose 97 to the outlet or discharge hose 98. The diaphragm is moved into and out of chamber 102, as shown in broken lines, with the operation of a hand-operated lever 107. The inner end of lever 107 is pivotally connected to a portion of housing 101 with a pivot pin 108. An arm 109 is secured to lever 107. A clamp 111 connects the outer end of arm 109 to the center portion of diaphragm 103 whereby, on operation of lever 107 in a reciprocal manner, as shown in arrow 112, the diaphragm 103 will move into and out of chamber 102.

FIGS. 7-9 show the inlet end of suction hose or tube 47. The terminal portion of tube 47 has an inlet opening 113. Generally U-shaped guard rods 114 and 115 extend across open end 113 to protect or guard the end of tube 47. The leg portions of rods 114 and 116 are secured to tube 47. A pivoting flapper or door 116 is pivotally mounted on a rod 117. Opposite ends of rod 117 are mounted on a box-shaped housing indicated generally at 118. Door 116 is located adjacent the inside of a short lip or flange 113A surrounding inlet opening 113 and normally closes the inlet opening. When door 116 is closed, the material in the tube 47 is prevented from reverse movement or flowing out of the tube through inlet opening 113. The material is free to move into tube 47 through the inlet opening 113 as door 116 pivots upwardly to a open position, as shown in broken lines in FIG. 8.

Box housing 118 has a generally flat top wall 119 and downwardly directed side walls 121 and 122. The side walls 121 and 122 are secured to the inlet end of pipes 47. Top wall 119 has a generally rectangular exit or discharge opening 123 open to the inside of tube 47 adjacent door 116. A movable cover or gate 124 is located on top of top wall 119 for closing opening 123. Longitudinal side rails 126 and 127 secured to opposite sides of top wall 119 slidably mount cover 124 on top wall 119 for movement between open and closed positions relative to opening 123. A biasing means 128, shown as a coil spring, functions to bias cover 124 to the closed position, as shown in FIGS. 7 and 8. One end of spring 128 is hooked onto an anchor or bolt 129 secured to top wall 119. The opposite end of spring 128 is connected to a Y-shaped member 131. Member 131 has arm portions that are secured to the top of cover 124 by welds or the like. The forward end of member 131 has an upwardly directed ear 132 accommodating an S-shaped hook 133. Spring 128 is hooked onto a portion of hook 133, as shown in FIG. 8. An elongated chain or flexible pull member 134 is connected to S-hook 133. Chain 134, as shown in FIG. 1, extends along the top of suction hose 47 to the pump housing 33. Chain 134 is used to transmit a pulling force from a remote location, as indicated by arrow 136, to open cover 134.

In use, a pull force is applied to chain 134 to move cover 124 against the biasing force of spring 128 to an open position. When cover 124 is open, the material in the tube 47 is free to flow back into holding means 16. This enables the operator to remove the tube 47 from the holding means without moving both the tube 47 and material in the tube. The material in tube 47 is allowed to drain out of the tube through the opening 123. This is accomplished without opening door 116.

In use, tractor 11 is connected to tongue 24 with a conventional hitch pin to hold pump frame 23 in a generally horizontal position. Suction hose 47 is attached to the inlet end of cone-shaped member 39 with connecting structure 48.

Pump apparatus 10 is primed before tractor 11 is used to rotate impeller 51. The hand-operated priming pump 94 is used to fill the pump chamber with liquid, such as water. The inlet end of hose 97 is placed in a supply of water. Hose 97 can be placed in holding means 16 so that the pump would prime with the material in the holding means. The on-off valve 99 is turned to the open position so that an operation of the pump handle 107 the liquid is moved by the pump 94 into chamber 43.

After chambers 38 and 43 are filled with liquid, the power of tractor 11 is applied to shaft 52 thereby rotating the impeller 51. The rotating impeller 51 discharges the material through discharge tube 66. The first valve assembly 69 is opened so that the material can flow through the outlet hose 79 back to the holding means 16 and thereby agitate and mix the material in the holding means. The second valve assembly 82 is closed.

The material is pumped to spreader tank 18 by closing the first valve assembly 69 and opening the second valve assembly 82. The material then will be pumped through the fill hose 89 and discharged to fill hole 19 of tank 18.

When tank 18 is filled, the power of tractor 11 is disengaged from shaft 52 thereby terminating the rotation of impeller 51. If it is desirable to move pump apparatus 10, discharge or fill pipe 89 is disconnected from the second valve assembly 82 and suction hose 47 is disconnected from the cone-shaped member 39. The material in suction hose 47 is allowed to drain back to holding means 16. This is accomplished by opening cover 124 and allowing the material in hose 47 to flow back into holding means 16. Cover 124 is opened by pulling chain 134. Hose 47 can be moved to a new location without moving the heavy material that is normally located in hose 47.

While there has been shown and described the preferred embodiment of the pump apparatus and suction hose structure, primer pump, and other features of the material handling apparatus, it is understood that changes in the structure can be made by those skilled in the art without departing from the invention. The invention is defined in the following claims.

The embodiments of the invention in which an enclusive property of privilege is claimed are defined as follows:

1. An apparatus for moving material comprising: pump means having a housing, said housing having a pump chamber, material inlet means open to the chamber, material outlet means open to the chamber, means within said chamber for moving material from the inlet means to the outlet means, suction hose means connected to the inlet means, said suction hose means having a passage and an inlet end, said inlet end having an inlet opening and an exit opening, said exit opening located at the inlet end of the suction hose means whereby substantially all of the material in the passage of the suction hose means can drain out of said passage externally of the suction hose means, when the means within said chamber for moving material is inoperative, first means movably mounted on the inlet end for closing the inlet opening to restrict movement of material out of the passage of the suction hose means through the inlet opening, means movably mounting said first means on said inlet end for movement to an open position on operation of the means within said chamber to allow material to flow into the passage of the suction hose means, second means movably mounted on said inlet end locatable in a first position closing the exit opening and movable from the first position to a second position opening the exit opening whereby substantially all of the material in the passage of the suction hose means can drain out of the passage of the suction hose means when the means within said chamber for moving material is inoperative, and discharge means connected to the outlet means, said discharge means having a passage for carrying material from the outlet means to a selected location.

2. The apparatus of claim 1 wherein: said first means is a movable door, said means movably mounting said first means comprise pivot means pivotally mounting the door on the inlet end whereby said door can pivot from a closed position closing the inlet opening to an open position allowing material to flow into the passage of the suction hose means.

3. The apparatus of claim 1 including: rod means attached to the inlet end and spaced from the inlet opening.

4. The apparatus of claim 1 including: means attached to the second means for biasing the second means to said first position closing the exit opening, and means connected to the second means for facilitating movement of the second means to the second position opening the exit opening.

5. The apparatus of claim 4 wherein: the means connected to the second means is an elongated member which allows the second means to be moved to the second position opening the exit opening from a remote location.

6. The apparatus of claim 1 wherein: the second means is a cover, and means mounting the cover on the inlet means whereby the cover can be selectively moved to a first open position and a second closed position relative to the inlet opening.

7. The apparatus of claim 6 wherein: the means mounting the cover on the inlet end includes rails attached to the inlet end.

8. The apparatus of claim 6 including: biasing means connected to the cover and inlet end for biasing the cover to the second closed position, and means connected to the cover for facilitating movement of the cover to the first open position.

9. The apparatus of claim 8 wherein: the means connected to the cover is an elongated member which allows the cover to be moved to the second position opening the exit opening from a remote location.

10. The apparatus of claim 1 wherein: said housing has a cylindrical wall surrounding the chamber, said means within said chamber for moving material comprising an impeller having a plate, said plate having a plurality of corners located in contiguous relation relative to said wall, and a plurality of blades secured to the plate and extended to the corners of the plate.

11. The apparatus of claim 10 wherein: the plate is a generally square plate, a hub being secured to the central portion of said square plate, said blades comprising generally flat members secured to the hub and plate and extended to the corners of the square plate.

12. The apparatus of claim 11 wherein: the hub is a tubular member adapted to accommodate a drive shaft.

13. The apparatus of claim 1 wherein: the inlet means includes a cone-shaped member attached to the housing, said cone-shaped member having a passage open to the chamber.

14. The apparatus of claim 1 wherein: the outlet means includes means having a first outlet section and a second outlet section, first valve means connected to the first outlet section for controlling the flow of material through said first outlet section, and second valve means connected to the second outlet section for controlling the flow of material through said second outlet section.

15. The apparatus of claim 14 wherein: the discharge means includes first discharge hose means connected to the first valve means, and second discharge hose means connected to the second valve means.

16. The apparatus of claim 15 wherein: each of said first and second valve means has a housing, a passage extended through the housing, and movable valving means for opening and closing the passage.

17. The apparatus of claim 16 including: a lever mounted on the housing and connected to the valving means, said lever being movable to selectively move the valving means to open and close the passage.

18. The apparatus of claim 1 including: a primer pump for supplying liquid to the pump chamber and passage of the suction hose means.

19. The apparatus of claim 18 including: means mounting the primer pump on the housing.

20. The apparatus of claim 18 wherein: the primer pump has a housing having a primer chamber, first means movable in said primer chamber to move material to the pump chamber, and second means connected to the first means operable to move the first means to pump material into the pump chamber.

21. The apparatus of claim 20 wherein: the first means is a diaphragm, and the second means is a lever.

22. An apparatus for moving material comprising: a housing having a chamber, material inlet means open to the chamber, material outlet means open to the chamber, impeller means in the chamber for moving material from the inlet means to the outlet means, suction conduit means including an elongated conduit member with a passage therethrough and having a first end adapted for connection to said material inlet means, and a remote end adapted to be placed in a source of material to be conveyed, one-way valve means operably connected to said conduit means and operable to open to permit passage of material through said conduit means in a direction from said remote end thereof toward said first end thereof and to close to preclude backflow therethrough, second valve means being connected to said inlet conduit means substantially adjacent said remote end, said second valve means including a valve passage connected to said inlet conduit means, valve closure means operable between open and closed positions for opening and closing said valve passage, respectively, and means operably connected to said valve closure means and extended to said first end of said inlet conduit means and there operable to move said valve closure means from open to closed positions, said valve closure means when in the open position allowing substantially all of the material in the passage of the conduit member to drain through the valve passage externally of said conduit member.

23. The apparatus of claim 22 wherein: said one-way valve means is located substantially at said remote end of said inlet conduit means.

24. The apparatus of claim 22 including: biasing means connected to the valve closure means to bias the valve closure means to the closed position.

25. A suction hose assembly for a pump comprising: an elongated tubular means having a passage for carrying material to a pump, said tubular means having an inlet end, said inlet end having an inlet opening and an exit opening, said exit opening located at the inlet end of the tubular means whereby substantially all of the material in the passage can drain out of said passage externally of said tubular means when the pump is inoperative, first means movably mounted on the inlet end closing the inlet opening restricting movement of material out of the passage of the tubular means and allowing movement of material into the passage of the tubular means through the inlet end when the pump is operative, second means movably mounted on said inlet end locatable in a first position closing the exit opening and movable from the first position to a second position opening the exit opening whereby substantially all of the material in the passage of the tubular means can flow out of said passage through the open exit opening when the pump is inoperative.

26. The assembly of claim 25 wherein: the first means is a door, and means pivotally mounting the door on the inlet end whereby said door can pivot from a closed position closing the inlet opening to an open position.

27. The assembly of claim 25 including: rod means attached to the inlet end and spaced from the inlet opening.

28. The assembly of claim 25 including: biasing means attached to the second means for biasing the second means to its closed position, and means connected to the second means for facilitating movement of the second means to its open position.

29. The assembly of claim 28 wherein: the second means is a cover, and means mounting the cover on the inlet means whereby the cover can be selectively moved to the open and closed positions relative to the exit opening.

30. The assembly of claim 29 wherein: the means mounting the cover include rails attached to the inlet end.

31. The assembly of claim 28 wherein: the means connected to the second means is an elongated means used to pull the second means to the open position from a remote location.

* * * * *

UNITED STATES PATENT AND TRADEMARK OFFICE
CERTIFICATE OF CORRECTION

PATENT NO. : 4,284,371
DATED : August 18, 1981
INVENTOR(S) : Jerome T. Paulson et al It is certified that error appears in the above-identified patent and that said Letters Patent are hereby corrected as shown below:

Column 6, lines 18 and 19, "enclusive" should be exclusive--.

Column 6, line 19, "of" should be --or--.

Signed and Sealed this

Third Day of November 1981

[SEAL]

Attest:

GERALD J. MOSSINGHOFF

Attesting Officer          Commissioner of Patents and Trademarks